United States Patent
Yamaguchi

(10) Patent No.: US 9,031,303 B2
(45) Date of Patent: May 12, 2015

(54) IMAGE PROCESSING METHOD, NUCLEAR MEDICINE DIAGNOSIS APPARATUS, AND STORAGE MEDIUM

(71) Applicant: Sumitomo Heavy Industries, Ltd., Tokyo (JP)

(72) Inventor: Takashi Yamaguchi, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 40 days.

(21) Appl. No.: 13/962,015

(22) Filed: Aug. 8, 2013

(65) Prior Publication Data
US 2014/0072200 A1 Mar. 13, 2014

(30) Foreign Application Priority Data
Sep. 10, 2012 (JP) .................. 2012-198933

(51) Int. Cl.
*G06T 7/00* (2006.01)
*G06T 11/00* (2006.01)
(52) U.S. Cl.
CPC .............. *G06T 7/0012* (2013.01); *G06T 11/005* (2013.01); *G06T 11/008* (2013.01)
(58) Field of Classification Search
USPC ................................................. 382/128–134
See application file for complete search history.

(56) References Cited

U.S. PATENT DOCUMENTS

| | | | |
|---|---|---|---|
| 2003/0031374 A1* | 2/2003 | Tajima et al. | 382/254 |
| 2006/0002632 A1* | 1/2006 | Fu et al. | 382/294 |
| 2006/0138332 A1 | 6/2006 | Bryman | |
| 2006/0204069 A1* | 9/2006 | Le Bras et al. | 382/132 |
| 2008/0253627 A1* | 10/2008 | Boyden et al. | 382/128 |

FOREIGN PATENT DOCUMENTS

| | | |
|---|---|---|
| JP | 2008-522168 | 6/2008 |
| JP | 2008-232641 | 10/2008 |

OTHER PUBLICATIONS

Garry Chinn et al: "A Method to Include Single Photon Events in Image Reconstruction for a 1 mm Resolution PET System Built with Advanced 3-D Positioning Detectors", Nuclear Science Symposium Conference Record, IEEE, Piscataway, NJ, USA, 2006, pp. 1740-1745.
M. Rodriguez et al: "IV. 3. Improvement of PET Image Reconstruction by Using the Single Events Spectrum", CYRIC Annual Report 2003 (Cyclotron and Radioisotope Center, Tohoku University), pp. 75-86.
Extended European Search Report dated Oct. 25, 2013.

* cited by examiner

*Primary Examiner* — Alex Liew
(74) *Attorney, Agent, or Firm* — IPUSA, PLLC

(57) ABSTRACT

A method performed by a nuclear medicine diagnosis apparatus includes reconstructing a first image from first measurement data obtained by detecting a pair of radioactive rays emitted from a measurement target; reconstructing a second image from second measurement data obtained by detecting a single radioactive ray emitted from the measurement target; and generating a final image based on the first image and the second image.

6 Claims, 11 Drawing Sheets

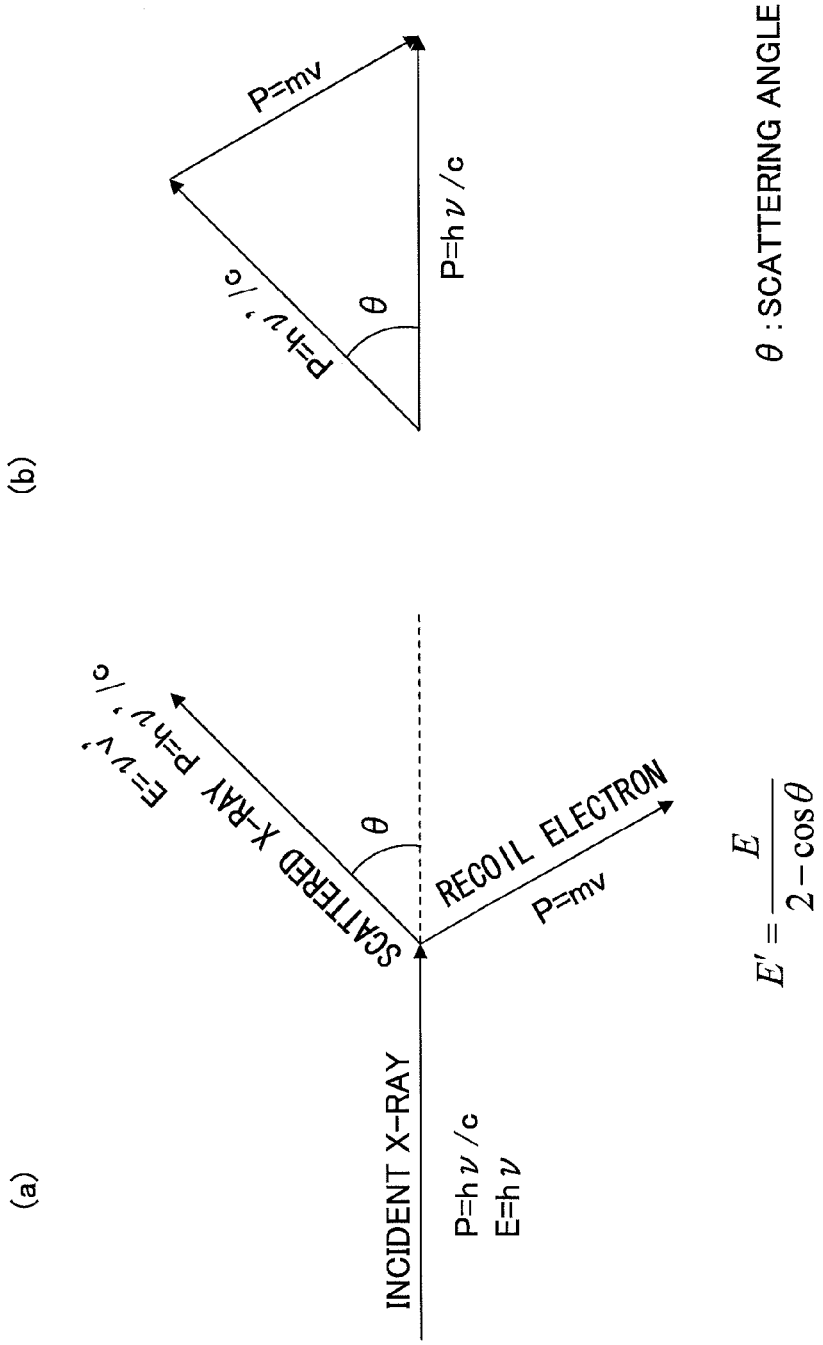

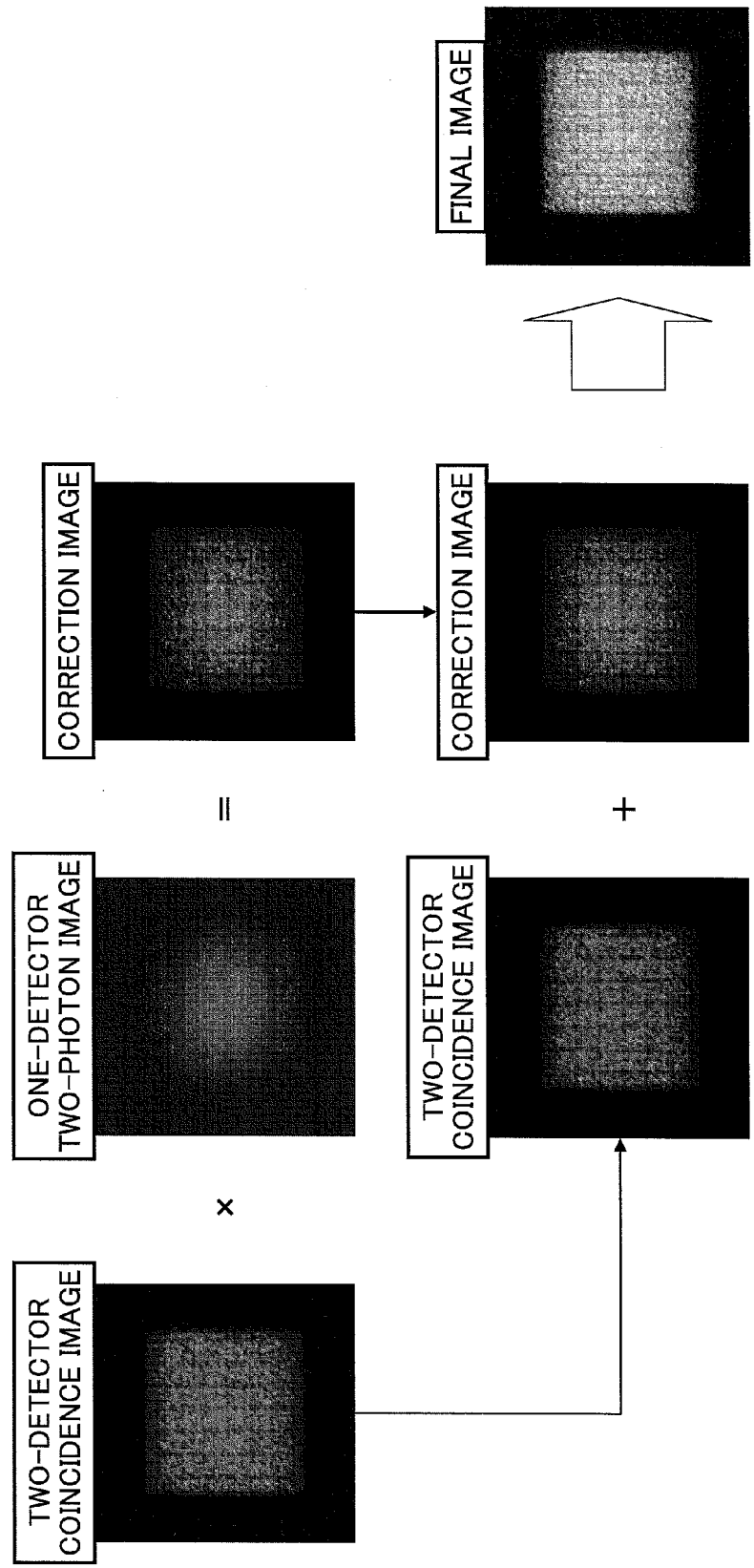

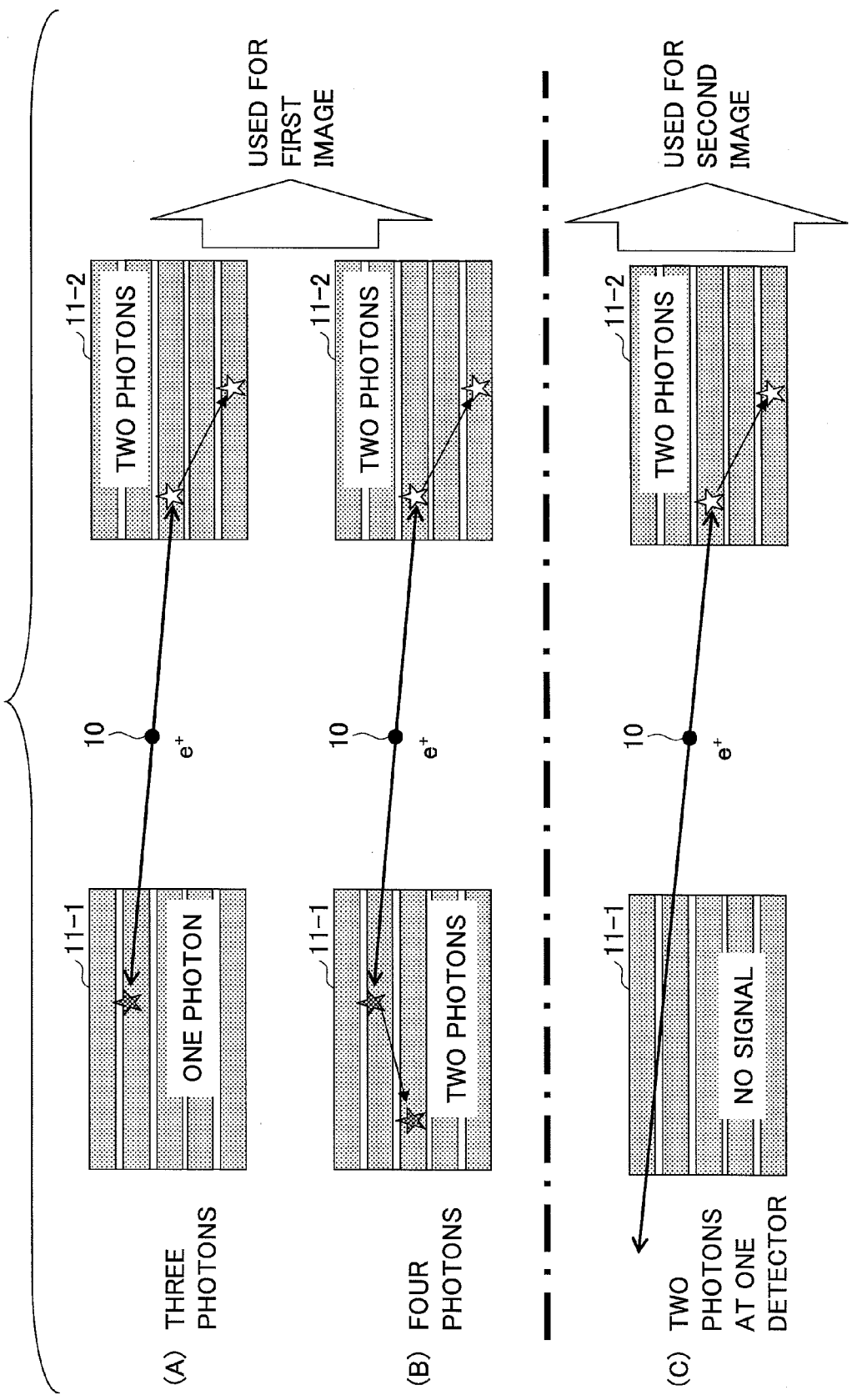

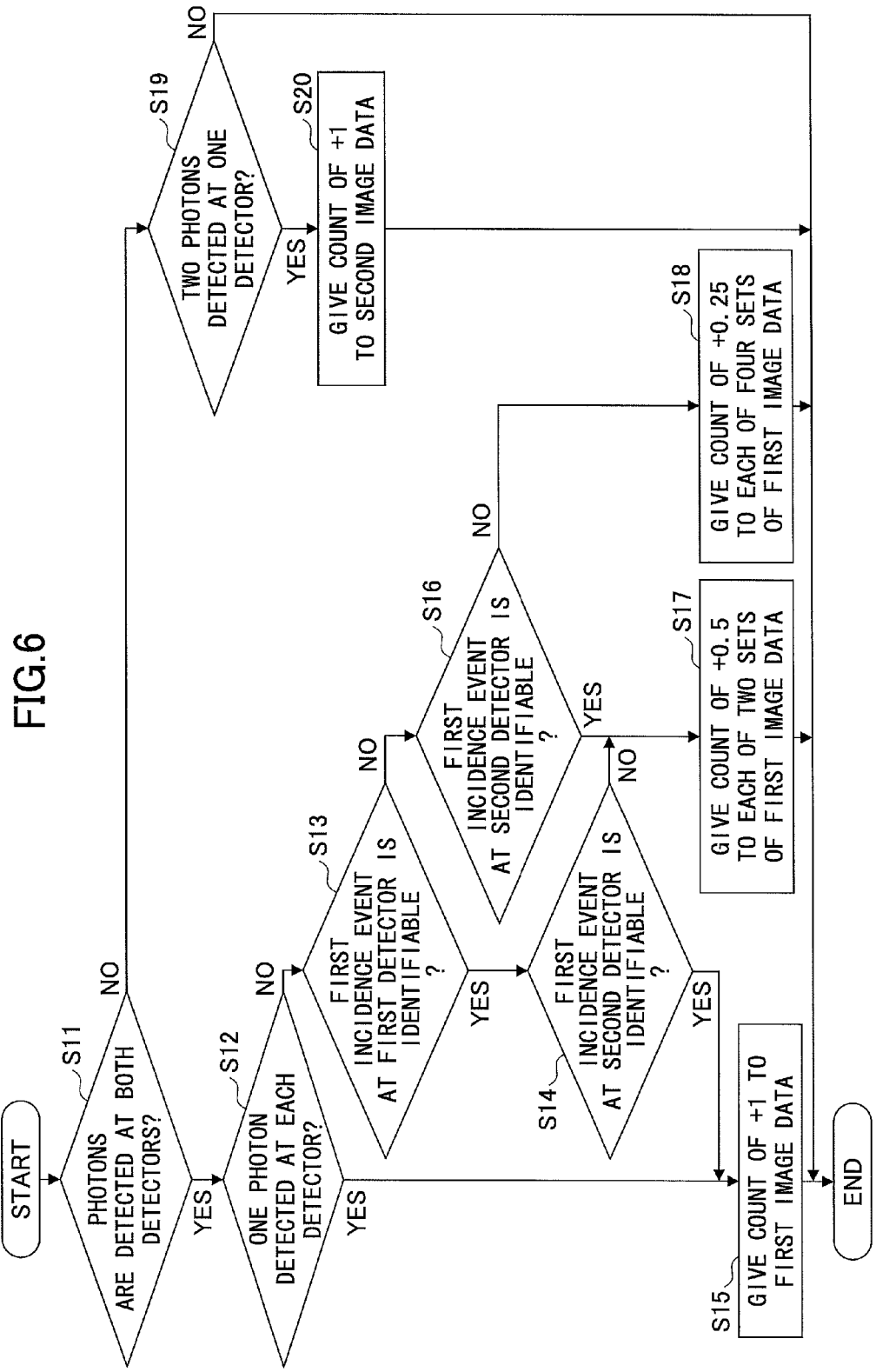

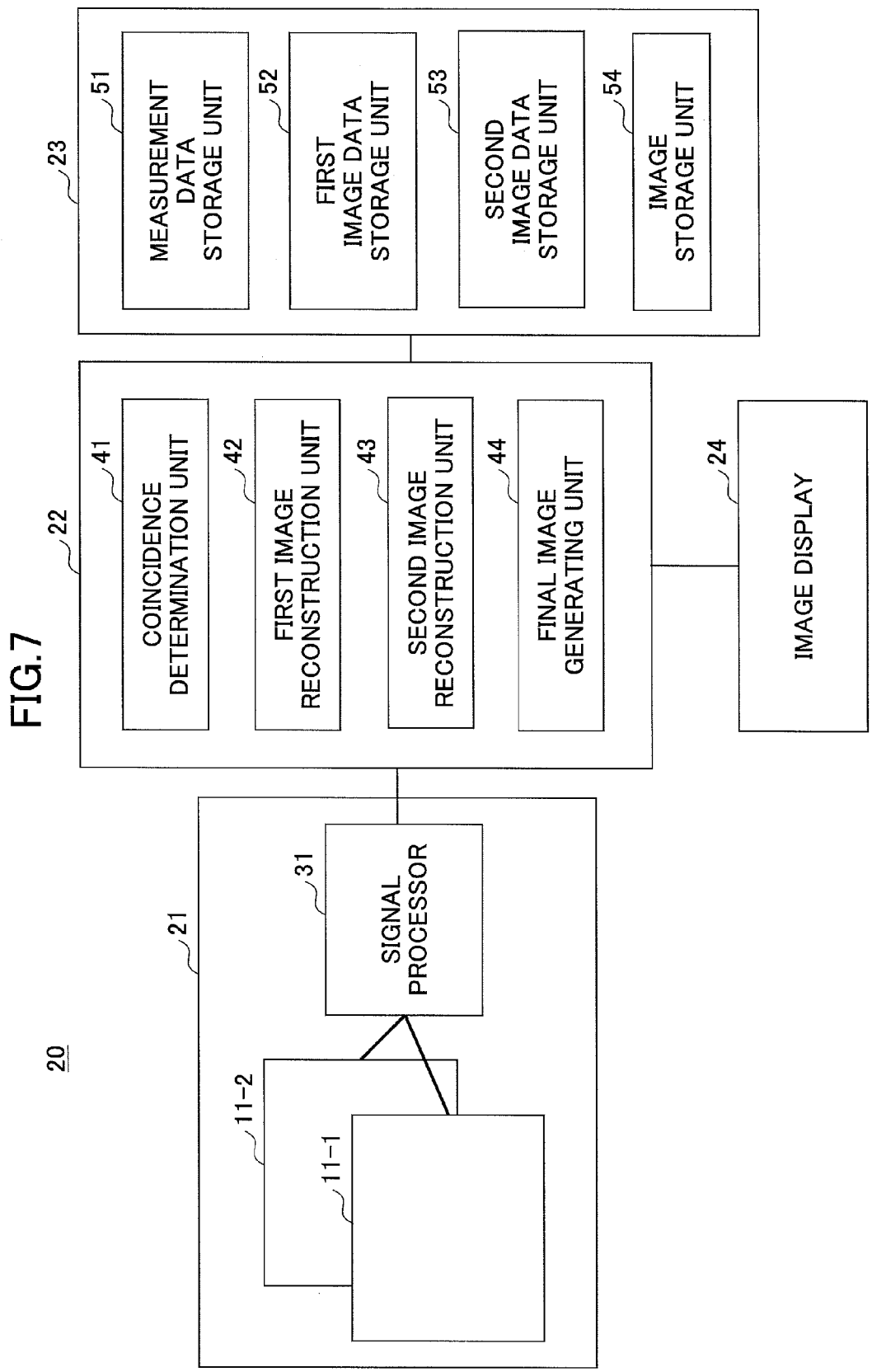

IMAGE PROCESSING METHOD, NUCLEAR MEDICINE DIAGNOSIS APPARATUS, AND STORAGE MEDIUM

CROSS-REFERENCE TO RELATED APPLICATION

The present application is based upon and claims the benefit of priority of Japanese Patent Application No. 2012-198933 filed on Sep. 10, 2012, the entire contents of which are incorporated herein by reference.

BACKGROUND OF THE INVENTION

1. Field of the Invention

An aspect of this disclosure relates to an image processing method, a nuclear medicine diagnosis apparatus, and a storage medium.

2. Description of the Related Art

Positron Emission Tomography (PET) is a technology for obtaining diagnostic images of the inside of a subject such as a human body or an animal. A PET apparatus can visualize the distribution of a radioactive isotope (RI) injected into the body of a subject.

In a diagnostic method using a PET apparatus, a test agent labeled (or marked) by a radioactive isotope that emits positrons is introduced into the body of a subject by, for example, injection or inhalation. The test agent introduced into the body is accumulated in a specific part of the body due to metabolism. The radioactive isotope labeling the test agent emits positrons, each emitted positron and a surrounding electron combine with each other and are thereby annihilated, and as a result, two gamma rays are emitted in opposite directions.

In a diagnosis method using a PET apparatus, the two gamma rays are detected and the detection results are processed by a computer to obtain distribution image data indicating the distribution of the radioactive isotope in the subject, and the subject is diagnosed based on a diagnostic image reconstructed from the distribution image data.

A gamma ray (radiation) detector for PET is implemented, for example, by a scintillation detector (e.g., bismuth germinate (BGO) or lutetium orthosilicate (LSO)). A scintillation detector can be manufactured at comparatively low costs. However, because a scintillation detector converts an incident gamma ray into light and converts the light into an electric signal using a photomultiplier tube, the resulting signal may be degraded during the conversion processes due to the spatial resolution and energy resolution.

On the other hand, a semiconductor detector can convert a gamma ray directly into an electric signal. For example, a semiconductor detector made of cadmium telluride (CdTe) has a higher spatial resolution and a higher energy resolution compared with a scintillation detector. However, a semiconductor detector made of cadmium telluride (CdTe) is less sensitive and more expensive than a scintillation detector.

Japanese Laid-Open Patent Publication No. 2008-232641, for example, discloses a method where Compton scattering is detected, and a gamma ray occurrence position detected by counting the coincidence at a pair of detectors (two-detector coincidence) is corrected based on the detected Compton scattering. Also, Japanese Laid-Open Patent Publication No. 2008-522168 discloses a method for reconstructing a cone from Compton scattering data by determining true events and accidental events. In a coincidence detection method, two or more sets of detection data obtained at a pair of detectors and having substantially the same gamma ray incident time are determined to be valid, sets of detection data having different gamma ray incident times are determined to be invalid, and image reconstruction is performed using the valid detection data to obtain a diagnostic image.

Here, to improve the sensitivity of a semiconductor detector, it is necessary to increase the volume of a semiconducting crystal such as a CdTe crystal. However, increasing the volume of a semiconducting crystal such as a CdTe crystal increases the costs of a semiconductor detector.

Also, the related-art methods disclosed in JP 2008-232641 and JP 2008-522168 are for correcting coincidence counting events. For example, in JP 2008-232641, the deviation of gamma rays from the 180 degree directions due to angular deviation is measured based on the principle of the Compton camera and an image is reconstructed taking into account the deviation; and in JP 2008-522168, a cone is reconstructed from Compton scattering data. Accordingly, the related-art methods do not increase the total number of valid events usable for reconstructing an image and therefore do not make it possible to obtain an image at high sensitivity.

SUMMARY OF THE INVENTION

In an aspect of this disclosure, a method performed by a nuclear medicine diagnosis apparatus includes reconstructing a first image from first measurement data obtained by detecting a pair of radioactive rays emitted from a measurement target; reconstructing a second image from second measurement data obtained by detecting a single radioactive ray emitted from the measurement target; and generating a final image based on the first image and the second image.

BRIEF DESCRIPTION OF THE DRAWINGS

FIGS. 3A and 3B are drawings used to describe an exemplary multi-photon detection method;

FIG. 4 is a drawing used to describe an exemplary method of generating a final image using a correction image;

FIG. 5 is a drawing used to describe another multi-photon detection method;

FIG. 6 is a flowchart illustrating an exemplary image data determination process based on multi-photon detection;

FIG. 7 is a block diagram illustrating an exemplary functional configuration of a nuclear medicine diagnosis apparatus;

DESCRIPTION OF EMBODIMENTS

An aspect of this disclosure relates to generation of a diagnostic image by, for example, a nuclear medicine diagnosis apparatus such as a PET apparatus. More specifically, an aspect of this disclosure makes it possible to improve detector sensitivity by using signals that are not detected at the same time by a pair of detectors and are ignored as noise in the related-art technologies.

Normally, in a PET apparatus, a pair of semiconductor detectors are arranged to face each other across a measurement target. When signals are detected at the same time by the pair of semiconductor detectors, the detection of the signals (i.e., the detection of a pair of radioactive rays, which is hereafter referred to as "two-detector coincidence" detection) is counted as one.

On the other hand, when multiple (e.g., two) signals (e.g., photons) resulting from a single radioactive ray are detected at only one of the pair of detectors, the detection of the signals (i.e., the detection of a single radioactive ray, which is hereafter referred to as "one-detector two-photon detection") is ignored as noise in the related-art technologies. According to an aspect of this disclosure, the incoming direction of a radioactive ray is narrowed down to a certain extent based on the principle of a Compton camera, and the detection of a single radioactive ray is also counted and added to a two-detector coincidence image. This approach makes it possible to obtain an image at high sensitivity and high resolution.

Here, however, because the incoming direction of a radioactive ray can be narrowed down only to a certain extent or range, simply adding the one-detector two-photon detection (the detection of a single radioactive ray) to a two-detector coincidence image may reduce the resolution of the two-detector coincidence image. For this reason, according to an aspect of this disclosure, a correction image is generated based on a two-detector coincidence image (detection of a pair of radioactive rays) and a one-detector two-photon image (detection of a single radioactive ray), and a final image is obtained at high sensitivity and high resolution based on the correction image and the two-detector coincidence image.

Preferred embodiments of the present invention are described below with reference to the accompanying drawings. In the descriptions below, PET is used as an example of an imaging technology. However, the present invention may also be applied to other imaging technologies.

<Image Processing Method>

Figure 1:
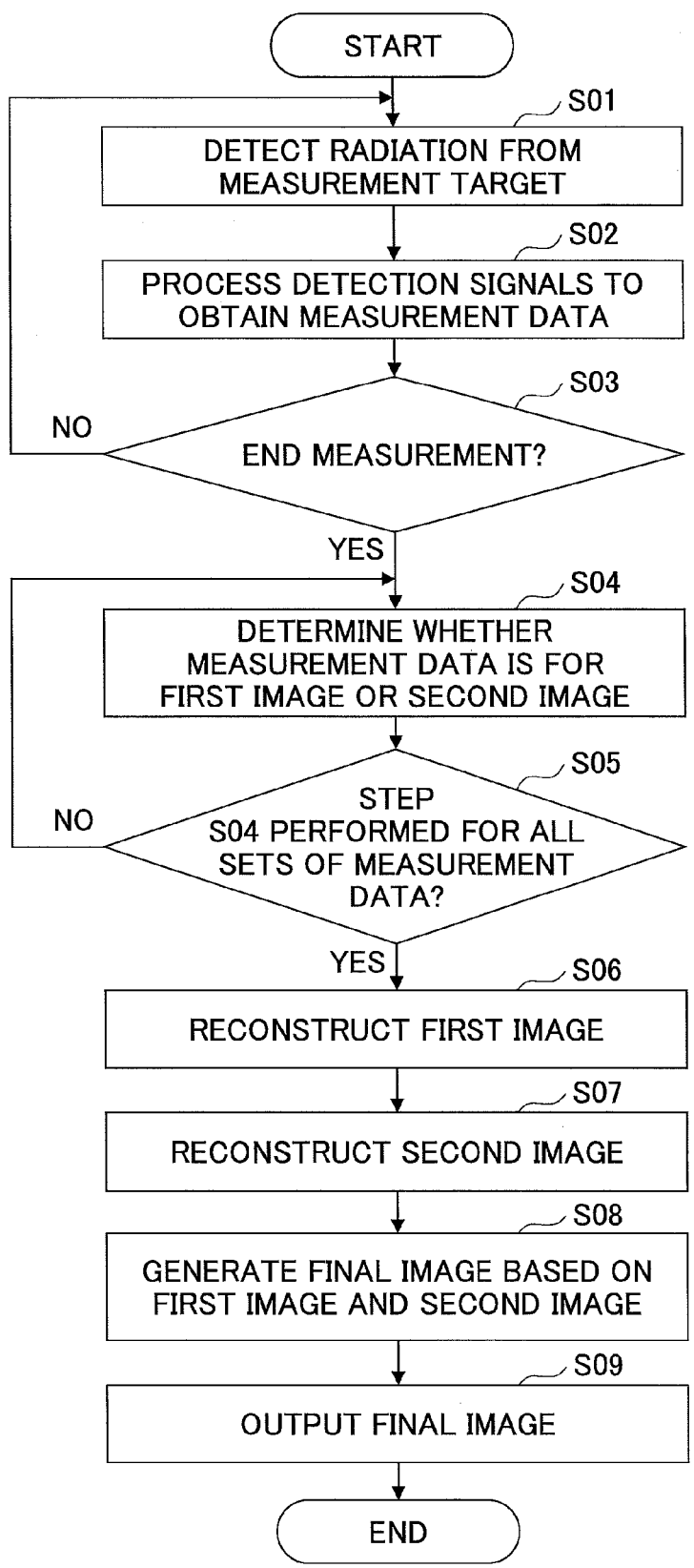
FIG. 1 is a flowchart illustrating an exemplary image processing method.

An exemplary image processing method is described below with reference to a flowchart. FIG. 1 is a flowchart illustrating an exemplary image processing method (or imaging process). The outline of the image processing method is described with reference to FIG. 1 and the details of the image processing method are described later. In FIG. 1, it is assumed that a test agent (or drug) has already been introduced into a measurement target (or subject).

In the image processing method of FIG. 1, radioactive rays (or radiation) from the measurement target (or subject) are detected by radiation detectors such as semiconductor detectors to obtain detection signals (S01), and measurement data is obtained based on the detection signals (S02).

Next, whether to end the measurement, i.e., the detection of radioactive rays, is determined based on, for example, a predetermined period of time set by, for example, a user (S03). When the measurement is not to be ended (NO at S03), steps S01 and S02 are repeated until the measurement data is obtained for the predetermined period of time. The measurement data is stored in a storage unit together with measurement time information indicating the time when the radioactive rays are detected or the measurement data is obtained.

For example, the predetermined period of time may be any period of time (e.g., 3 min., 30 min., 60 min., 90 min., or 120 min.) set by a user, a period of time that is necessary for the number of detected radioactive rays (e.g., gamma rays) to reach a predetermined value, a period of time necessary for the movement of the test agent to become less than a predetermined value, or a decay time of radioactive rays. Also, the predetermined period of time may be determined based on any other criteria. For example, the predetermined period of time may be determined based on a combination of the above described criteria.

When it is determined to end the measurement (YES at S03), whether each set of obtained measurement data is first image data or second image data is determined (S04). For example, when measurement data is based on detection signals of a pair of radioactive rays detected by a pair of detectors, the measurement data is determined as first image data. On the other hand, when measurement data is based on a detection signal of a single radioactive ray detected by one of the pair of detectors, the measurement data is determined as second image data.

Next, whether step S04 has been performed for all sets of obtained measurement data is determined (S05). When step S04 has not been performed for all sets of obtained measurement data (NO at S05), the process returns to step S04. On the other hand, when step S04 has been performed for all sets of obtained measurement data (YES at S05), a first image is reconstructed from sets of first image data (S06), and a second image is reconstructed from sets of second image data (S07).

Next, a final image is generated based on the first image and the second image (S08). At step S08, for example, a correction image is generated based on the first image and the second image, and the correction image and the first image are combined (or added) to generate a final image. However, any other method may also be used to generate a final image. Details of generating a final image are described later.

Then, the final image generated at step S08 is output (S09). At step S09, for example, the final image is output to a file or displayed on a display. The above method of the present embodiment makes it possible to obtain a diagnostic image at high sensitivity and high resolution even with semiconductor detectors.

<Detection of Radioactive Rays>

Figure 2A:
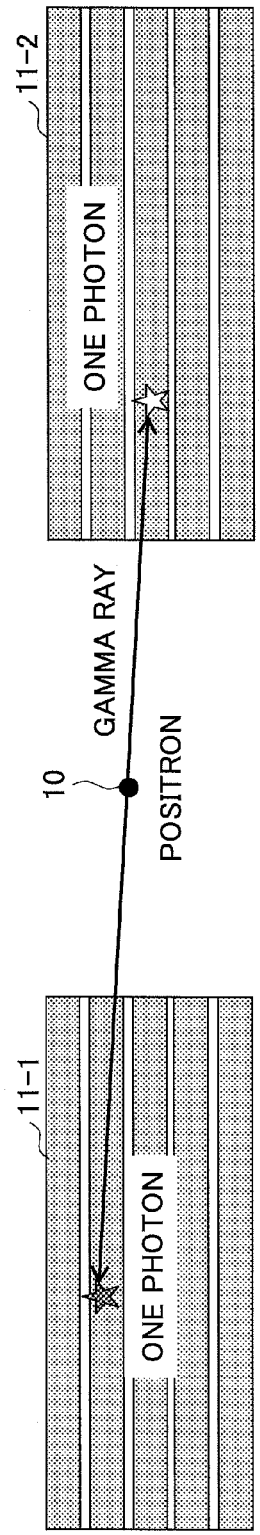
FIGS. 2A and 2B are drawings used to describe exemplary methods of detecting radioactive rays.
Figure 2B:
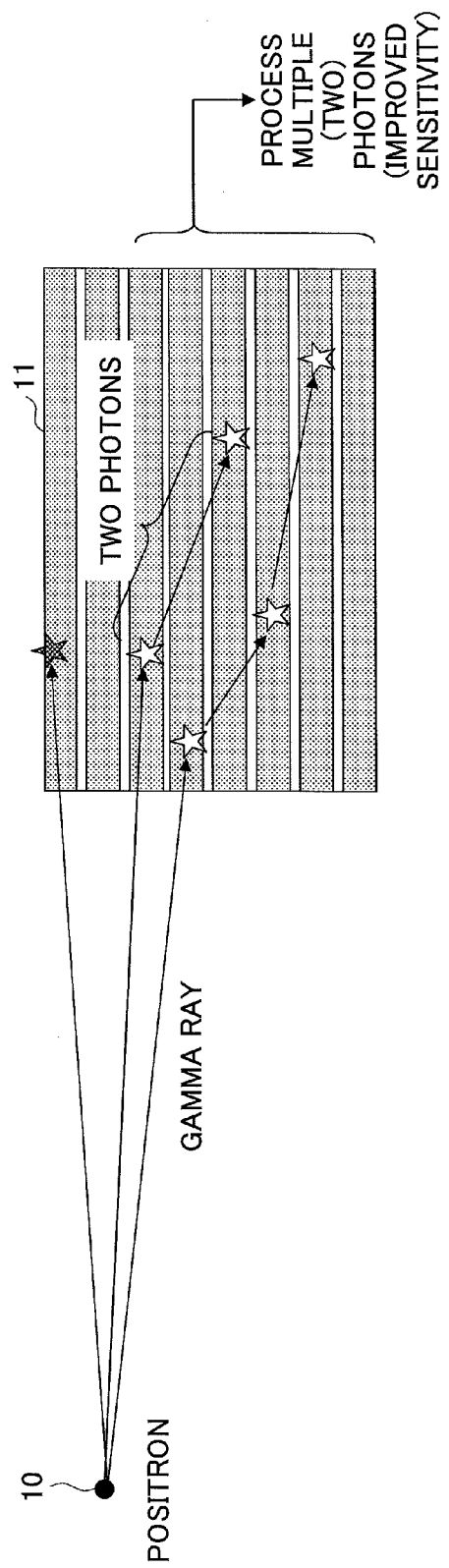

Exemplary methods of detecting radioactive rays are described below. FIGS. 2A and 2B are drawings used to describe exemplary methods of detecting radioactive rays. FIG. 2A illustrates detection of radioactive rays whose detection results (two-detector coincidence detection or detection of a pair of radioactive rays) are used to generate a first image. FIG. 2B illustrates detection of radio active rays whose detection results (one-detector two photon detection or detection of a single radioactive ray based on multi-photon detection) are used to generate a second image.

In the two-detector coincidence detection of FIG. 2A, photons of radioactive rays (gamma rays) emitted in symmetrical directions from a positron 10 in a measurement target (subject) are detected, respectively, by radiation detectors 11-1 and 11-2 that face each other across the positron 10 (one photon is detected by each radiation detector 11). In other words, a pair of radioactive rays is detected by the radiation detectors 11-1 and 11-2. Also, a pair of radioactive rays may be detected in any other manner. For example, when events (signals) of one or more photons are detected at each of a pair of detectors and when it is determined that those photons are emitted from the same positron, it may be determined that a pair of radioactive rays has been detected.

In the one-detector two photon detection (multi-photon detection) of FIG. 2B, gamma rays emitted from the positron 10 are detected at least by one of the radiation detectors 11. According to the present embodiment, multiple photons scattered in multiple directions are detected and processed based on the principle of the Compton scattering to improve the sensitivity. For example, two scattered photons are preferably detected. However, the number of photons to be detected is not limited to two, and three or more photons may be detected.

With the multi-photon detection method of the present embodiment, the direction (or position) of the positron 10 can be estimated based on non-coincident two photons detected at one detector. Accordingly, a second image can be reconstructed based on the results of the one-detector two photon detection and a final image can be obtained at high sensitivity and high resolution based on the second image and a first image obtained based on the results of the two-detector coincidence detection.

Figure 3B:
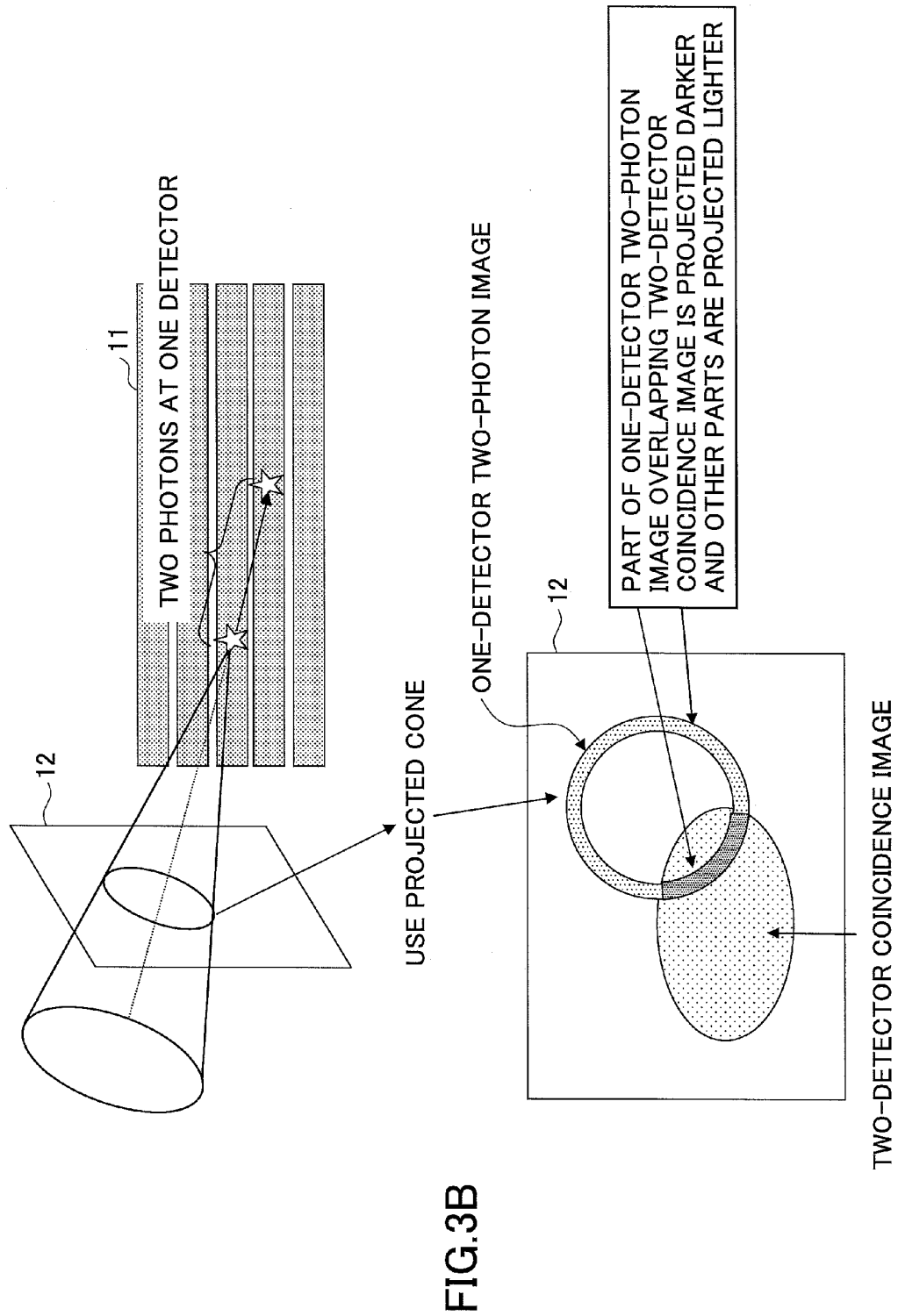

FIGS. 3A and 3B are drawings used to describe an exemplary multi-photon detection method. In FIGS. 3A and 3B, it is assumed that two photons are detected at one detector. FIG. 3A is used to describe the principle of the Compton scattering and indicates the relationship between the energy (E=511 KeV) of an incident photon and the energy (E') of a scattered photon. FIG. 3B illustrates an exemplary method of generating a correction image from a first image and a second image.

A Compton camera is a technique for obtaining the positions and angles of two scattered photons based on the principle of the Compton scattering. As illustrated by FIG. 3A, when P=hv/c and E=hv are true for an incident X-ray ((a) of FIG. 3A), a scattered X-ray and a recoil electron scatter at a scattering angle θ ((b) of FIG. 3A). In FIG. 3A, "P" indicates momentum, "h" indicates Planck's constant, "v" indicates a frequency of the photon, "c" indicates the electromagnetic constant, "m" indicates mass, and "v" indicates velocity.

The relationship between the energy (E) of the incident photon and the energy (E') of the scattered photon is represented by a formula $E'=E/(2-\cos \theta)$. According to the present embodiment, two photons of gamma rays emitted from the same positron 10 are detected based on the relationship between the energy (E) of the incident photon and the energy (E') of the scattered photon. Three or more photons can also be detected in a similar manner.

When multiple photons (e.g., two photons at one detector) are detected by the radiation detector 11, cone-shaped positional information of the photons is projected onto a projection plane 12 such that the projected image (one-detector two-photon image, i.e., a second image) overlaps a radiation source part of a two-detector coincidence image (first image). A correction image is generated by projecting an overlapping part of the first and second images darker and projecting non-overlapping parts of the first and second images lighter. The correction image is used to generate a final image.
<Generation of Final Image>

FIG. 4 is a drawing used to describe an exemplary method of generating a final image using a correction image. As illustrated by FIG. 4, a two-detector coincidence image corresponding to the above-described first image and a one-detector two-photon image corresponding to the above-described second image are generated. A correction image is generated by multiplying the two-detector coincidence image and the one-detector two-photon image together in units of, for example, pixels or pixel regions each composed of a predetermined number of pixels.

Then, a final image is generated by combining (or adding) the two-detector coincidence image (first image) and the correction image in units of pixels or pixel regions. The above method makes it possible to obtain an image at high sensitivity and high resolution using, for example, semiconductor detectors. The above method may also be applied to scintillation detectors to obtain an image at high sensitivity and high resolution.

In the multi-photon detection method described above, one of a pair of radiation detectors 11 is used. However, the present invention is not limited to the specifically disclosed embodiment. For example, when a single radioactive ray is detected at each of a pair of radiation detectors 11, the detection at each of the radiation detectors 11 may be added to a count.
<Variation of Multi-Photon Detection Method>

The above-described multi-photon detection method may also be used to obtain a first image. FIG. 5 is a drawing used to describe another exemplary multi-photon detection method. In the example of FIG. 5, whether detection data is used as first image data or second image data is determined based on whether two-detector coincidence is detected.

In FIG. 5, it is assumed that radioactive rays from a measurement target are detected using a pair of radiation detectors 11-1 and 11-2. In the example of FIG. 5 (A), one photon is detected by the radiation detector 11-1 and two photons are detected by the radiation detector 11-2. In this case, because photons are detected at both of the radiation detectors 11-1 and 11-2, the detection data of the three photons is used for a first image. In the example of FIG. 5 (B), two photons are detected at each of the radiation detectors 11-1 and 11-2. Also in this case, because photons are detected at both of the radiation detectors 11-1 and 11-2, the detection data of the four photons is used for a first image. Thus, according to the method of FIG. 5, detection data is counted not only when one photon is detected at each of two detectors, but also when multiple photons are detected at one or both of the two detectors.

In the example of FIG. 5 (C), two photons are detected only at the radiation detector 11-2. In this case, the detection data of the two photons is used for a second image.

Thus, according to the multi-photon detection method of FIG. 5, whether detection data is used for a first image or a second image is determined, and the first image and the second image are reconstructed based on the determination results. Accordingly, this method also makes it possible to obtain a diagnostic image at high sensitivity and high resolution based on the first image and the second image.
<Image Data Determination Process>

An exemplary image data determination process based on multi-photon detection is described below with reference to a flowchart. FIG. 6 is a flowchart illustrating an exemplary image data determination process based on multi-photon detection. In FIG. 6, whether photons have been detected at both of first and second detectors is determined (S11). When photons have been detected at both of the first and second detectors (YES at S11), whether an event (signal) of one photon (one photon event) has been detected at each of the first and second detectors is determined (S12).

When the one photon event has not been detected at each of the first and second detectors, i.e., when two or more photons have been detected at one or both of the first and second detectors (NO at S12), whether the first incidence event (an event of a photon that has entered first) at the first detector is identifiable is determined (S13). When the first incidence event at the first detector is identifiable (YES at S13), whether the first incidence event at the second detector is identifiable is determined (S14).

When the one photon event has been detected at each of the first and second detectors at step S12 (YES at S12) or when the first incidence event at the second detector is identifiable at step S14 (YES at S14), a count of +1 is given to first image data (S15). Thus, even when multiple photons are detected at each of the first and second detectors, a count of +1 is given to first image data as long as the first incidence event at each of the first and second detectors is identifiable (i.e., YES at S13 and S14).

When the first incidence event at the first detector is not identifiable (NO at S13), whether the first incidence event at the second detector is identifiable is determined (S16).

When the first incidence event at the second detector is not identifiable at step S14 (NO at S14) or when the first incidence event at the second detector is identifiable at step S16 (YES at S16), a count of +0.5 is given to each of two sets of first image data (S17). Step S17 may correspond, for example, to a case represented by FIG. 5 (A). In this case, a count of +0.5 is given to each of combinations (in this example, two combinations) of a photon detected at the radiation detector 11-1 and two photons detected at the radiation detector 11-2.

When the first incidence event at the second detector is not identifiable (NO at S16), a count of +0.25 is given to each of four sets of first image data (S18). Step S18 may correspond, for example, to a case represented by FIG. 5 (B). In this case, a count of +0.25 is given to each of combinations (in this example, four combinations) of two photons detected at the radiation detector 11-1 and two photons detected at the radiation detector 11-2. Thus, according to steps S17 and S18, detection results are not discarded but are used to obtain a high resolution image by adjusting the counts of the detection results. The counts given to first image data at steps S17 and S18 are not limited to those specifically disclosed, but may be set at any appropriate values.

When photons have not been detected at both of the first and second detectors (NO at S11), whether events of two photons (two photon events) have been detected at one of the first and second detectors is determined (S19). When the two photon events have been detected at one of the first and second detectors (YES at S19), a count of +1 is given to second image data (S20). Step S20 may correspond, for example, to a case represented by FIG. 5 (C). On the other hand, when the two photon events have not been detected at either one of the first and second detectors (NO at S19), the process is terminated without giving any count to image data. Although detection of two photon events is determined at step S19, the number of detected photons used as a determination condition is not limited to two. For example, detection of three photon events may be determined at step S19. With the above described process, it is possible to properly determine whether detection data is used as first image data or second image data and thereby reconstruct a high-resolution image.

<Nuclear Medicine Diagnosis Apparatus: Functional Configuration>

An exemplary configuration of a nuclear medicine diagnosis apparatus that can perform the above-described image processing method is described below. FIG. 7 is a block diagram illustrating an exemplary functional configuration of a nuclear medicine diagnosis apparatus 20 of the present embodiment. As illustrated by FIG. 7, the nuclear medicine diagnosis apparatus 20 may include a radiation measuring unit 21, a data processing unit 22, a storage unit 23, and an image display 24.

The radiation measuring unit 21 may include radiation detectors 11 and a signal processor 31. The data processing unit 22 may include a coincidence determination unit 41, a first image reconstruction unit 42, a second image reconstruction unit 43, and a final image generating unit 44. The storage unit 23 may include a measurement data storage unit 51, a first image data storage unit 52, a second image data storage unit 53, and an image storage unit 54. The storage unit 23 may instead be provided in the radiation measuring unit 21 or the data processing unit 22.

The radiation detectors 11 include at least a pair of detectors 11-1 and 11-2 that detect radioactive rays (e.g., gamma rays) emitted from a measurement target and convert the detected radioactive rays into electric signals. The radiation detectors 11 may also be composed of multiple detectors that are arranged in a circle around a measurement target. The radiation detectors 11 may be implemented by, but are not limited to, semiconductor detectors. Alternatively, the radiation detectors 11 may be implemented by scintillation detectors. The radiation detectors 11 output electric signals obtained by converting gamma rays to the signal processor 31.

The signal processor 31 converts the electric signals (analog data) input from the radiation detectors 11 into measurement data (digital data) used for measurement and diagnosis. The signal processor 31 outputs the measurement data to the storage unit 23 and stores the measurement data in the measurement data storage unit 51. The signal processor 31 also outputs, to the data processing unit 22, various types of processing information such as signal processing progress information (e.g., information indicating elapsed time corresponding to measurement data currently stored in the storage unit 23) and processing result information (e.g., information indicating that a predetermined time period of measurement data is stored in the storage unit 23).

The coincidence determination unit 41 performs coincidence determination for photons detected by the radiation detectors 11 based on the multi-photon detection method described above. More specifically, the coincidence determination unit 41 performs a process as described above with reference to FIG. 6 to determine whether measurement data is used as first image data or second image data. Also, the coincidence determination unit 41 stores measurement data determined as first image data in the first image data storage unit 52 and stores measurement data determined as second image data in the second image data storage unit 53.

The first image reconstruction unit 42 obtains, from the processing results of the radiation measuring unit 21, a predetermined time period of measurement data that has been determined by the coincidence determination unit 41 as first image data, and reconstructs an image (first image) from the obtained measurement data to obtain, for example, a tomographic image of a measurement target. The first image reconstruction unit 42 may be configured to reconstruct an image based on the whole or a part of measurement data stored in the first image data storage unit 52.

The second image reconstruction unit 43 obtains, from the processing results of the radiation measuring unit 21, a predetermined time period of measurement data that has been determined by the coincidence determination unit 41 as second image data, and reconstructs an image (second image) from the obtained measurement data to obtain, for example, a tomographic image of a measurement target. The second image reconstruction unit 43 may be configured to reconstruct an image based on the whole of measurement data stored in the second image data storage unit 53.

The final image generating unit 44 generates a final image based on the first image reconstructed by the first image reconstruction unit 42 and the second image reconstructed by the second image reconstruction unit 43. More specifically, the final image generating unit 44, for example, multiplies the first image and the second image using a correction coefficient to generate a correction image. Then, the final image generating unit 44 generates a final image by adding the correction image and the first image.

The final image generating unit 44, for example, stores the generated final image in the image storage unit 54 or displays the generated final image on the image display 24.

The storage unit 23 may be implemented by, but is not limited to, a hard disk drive (HDD) or a random access memory (RAM).

The image display 24 displays, for example, processing status information and processing result information output by the data processing unit 22 and various types of information stored in the storage unit 23. The image display 24 may be implemented, but is not limited to, a liquid crystal monitor. According to the present embodiment, an obtained image (e.g., a diagnostic image) may be displayed on the image display 24 for review by the user. The image display 24 may also be configured to display error information indicating an error occurred in the nuclear medicine diagnosis apparatus 20.

The data processing unit 22, the storage unit 23, and the image display 24 may be implemented by a general-purpose personal computer (PC).

The above-described process of the nuclear medicine diagnosis apparatus 20 may be performed at once (or continuously). Alternatively, the process may be divided into two or more parts at appropriate timing and the parts may be performed at different times. For example, the process may be divided into a part where measurement data is obtained by the radiation measuring unit 21 and images are reconstructed from the measurement data and stored, and a remaining part.

<Calculation of Final Image>

An exemplary method performed by the final image generating unit 44 to calculate a final image is described below. In the descriptions below, $x_i$ indicates a pixel value of an i-th pixel of a two-detector coincidence image, $y_i$ indicates a pixel value of an i-th pixel of a one-detector two-photon image, $cy_i$ indicates a pixel value of an i-th pixel of a correction image, and $z_i$ indicates a pixel value of an i-th pixel of a final image. Also in the descriptions below, $sy_i$ indicates a sum of pixel values of the one-detector two-photon image and $scy_i$ indicates a sum of pixel values of the correction image.

The sum of pixel values of the one-detector two-photon image is obtained by formula (1) below. The pixel value of an i-th pixel of the correction image is obtained by formula (2) below. The sum of pixel values of the correction image is obtained by formula (3) below.

$$sy_i = \sum_i y_i \tag{1}$$

$$cy_i = x_i \times y_i \tag{2}$$

$$scy_i = \sum_i cy_i \tag{3}$$

Based on the relationship among formulas (1) through (3) above, the pixel value of an i-th pixel of the final image is obtained by formula (4) below.

$$z_i = x_i + cy_i \times sy_i / scy_i \tag{4}$$

The method of calculating a final image is not limited to that described above. For example, a predetermined correction coefficient may be used to generate a correction image from a first image and a second image.

<Nuclear Medicine Diagnosis Apparatus: Hardware Configuration>

The above described functional units, except for the radiation measuring unit 21, of the nuclear medicine diagnosis apparatus 20 and the image processing of the present embodiment may be implemented by executing a computer-executable program (e.g., an image processing program) stored in, for example, a general-purpose PC or a server.

Figure 8:
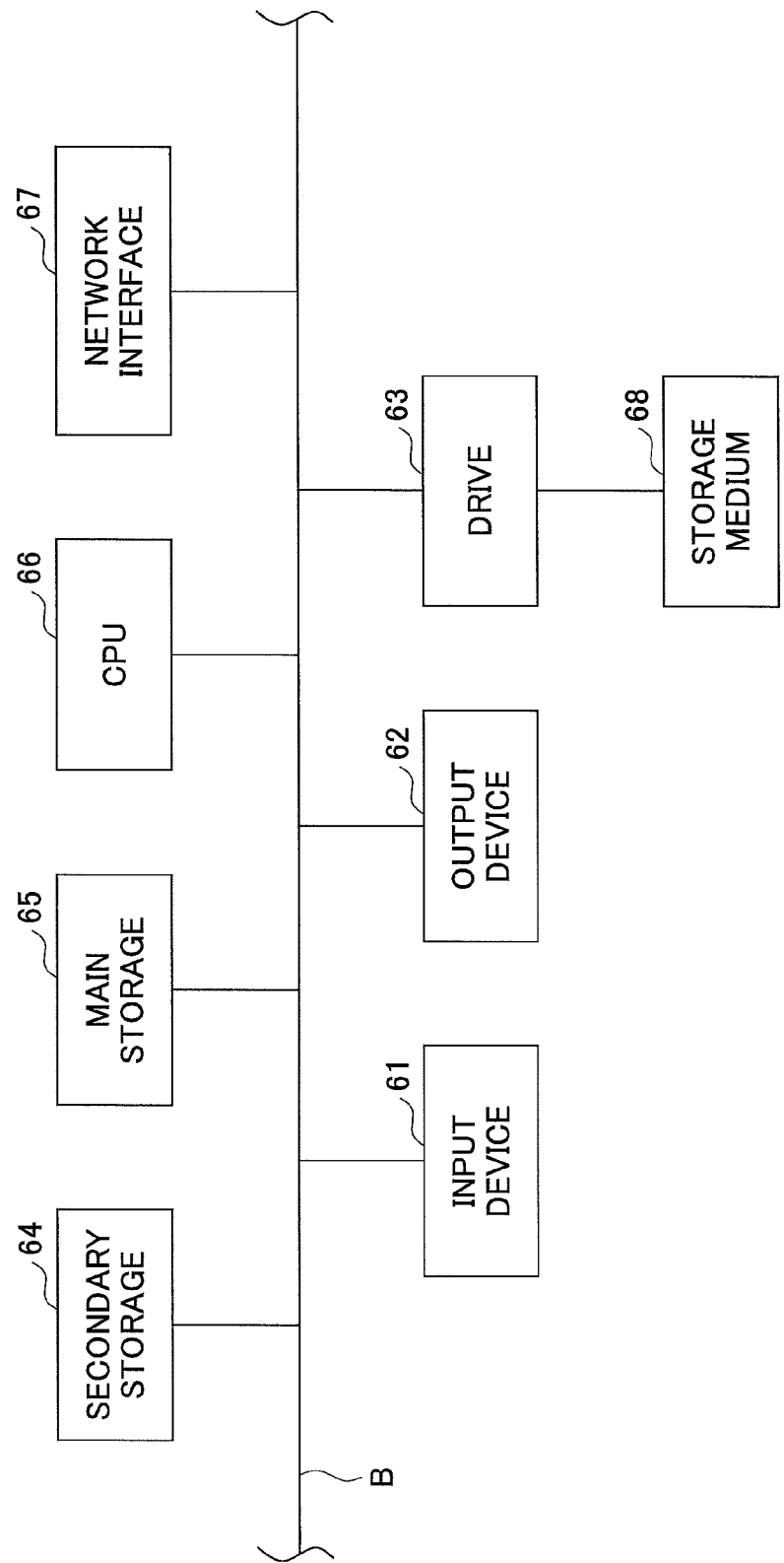
FIG. 8 is a block diagram illustrating an exemplary hardware configuration of a computer.

An exemplary hardware configuration of a computer that can perform the image processing of the present embodiment is described below. FIG. 8 is a block diagram illustrating an exemplary hardware configuration of a computer that can perform the image processing of the present embodiment.

A computer illustrated by FIG. 8 includes an input device 61, an output device 62, a drive 63, a secondary storage 64, a main storage 65, a central processing unit (CPU) 66 for performing various control processes, and a network interface 67 that are connected to each other via a system bus B.

The input device 61 may include a keyboard and a pointing device, such as a mouse, used by the user, for example, to execute programs, specify settings, and enter commands. The input device 61 may also include a function to input information obtained from the radiation measuring unit 21 provided as an external component.

The output device 62 may include a display for displaying various data and windows used to operate the computer to perform processes of the present embodiment. The output device 62 displays, for example, progress status and processing results of programs according to a control program of the CPU 66.

According to the present embodiment, executable programs to be installed in the computer may be provided via, for example, a portable storage medium 68 such as a universal serial bus (USB) memory or a CD-ROM. The storage medium 68 storing the programs is mountable on the drive 63. The programs stored in the storage medium are installed via the drive 63 into the secondary storage 64.

The secondary storage 64, for example, is a hard disk and stores executable programs of the present embodiment and control programs provided for the computer. The stored execution programs and control programs can be retrieved from the secondary storage 64 as necessary.

The main storage 65 stores, for example, the execution programs retrieved by the CPU 66 from the secondary storage 64. The main storage 65 includes, for example, a read only memory (ROM) and a random access memory (RAM).

The CPU 66 performs various calculations and data input/output operations from and to other hardware components according to control programs such as an operating system (OS) and the executable programs stored in the main storage 65, and thereby controls the entire computer to perform various processes for image processing. The CPU 66 may obtain information necessary for the execution of the programs from the secondary storage 64, and store information resulting from the execution of the programs in the secondary storage unit 64.

The network interface 67 connects the computer to, for example, a communication network and thereby allows the computer to obtain executable programs from another terminal connected to the communication network and to send the results obtained by executing the programs or the programs themselves to another terminal.

The above hardware configuration makes it possible to perform image processing of the present embodiment. Thus, image processing of the present embodiment may be performed by executing a program on a general-purpose personal computer.

Examples of semiconductors usable for radiation detectors of the present embodiment may include, but are not limited to, C (diamond), 4H—SiC (silicon carbide), HgI2 (mercuric iodide), GaAs (gallium arsenide), CdTe (cadmium telluride), CZT (cadmium zinc telluride), Si (silicon), Ge (germanium), and InSb (indium antimonide). One or more of these semiconductors may be used for radiation detectors of the present embodiment.

<Comparison>

A final image obtained according to the present embodiment was compared with a final image obtained according to a related-art method. For the comparison, simulations were performed using Geant4 Application for Tomographic Emission (GATE) code simulation system. Also for the comparison, the distance between a pair of detectors was set at 60 cm, the radiation source was set at the center of the field of vision, a cylindrical phantom (measurement target) with a diameter of about 10 cm and a height of about 10 cm was used, and a nuclide of $^{11}$C-1.85 MBq was used. With these conditions, photons were detected for three minutes to obtain detection data.

With the related-art method where only the two-detector coincidence detection is counted, the obtained count was 21.3. On the other hand, with the method of the present embodiment, the obtained count was 62.5. Thus, with the method of the present embodiment, the sensitivity increased about three times. Accordingly, the present embodiment makes it possible to improve the sensitivity and thereby makes it possible to obtain a high-resolution image.

<Charged Particle Radiation Therapy Apparatus Including Nuclear Medicine Diagnosis Apparatus>

The nuclear medicine diagnosis apparatus 20 of the present embodiment may be included, for example, in a charged particle radiation therapy apparatus that irradiates a subject (e.g., a patient) with a charged particle beam such as a proton beam or a heavy particle beam to treat a tumor (e.g., cancer). In this case, the charged particle radiation therapy apparatus obtains an image of a subject (measurement target) before or after the treatment according to the image processing method of the present embodiment.

When a subject is irradiated with a charged particle beam, a positron emitter is generated by a nuclear reaction between the charged particle beam and the nucleus of a tumor in the subject, and gamma rays are emitted from the positron emitter. Here, the position of a part of the subject that is irradiated by the charged particle beam can be accurately determined by detecting the gamma rays with the nuclear medicine diagnosis apparatus 20 in the charged particle radiation therapy apparatus. Thus, with the nuclear medicine diagnosis apparatus 20, it is possible to confirm whether parts of the subject are correctly irradiated by the charged particle beam according to a treatment plan.

Figure 9:
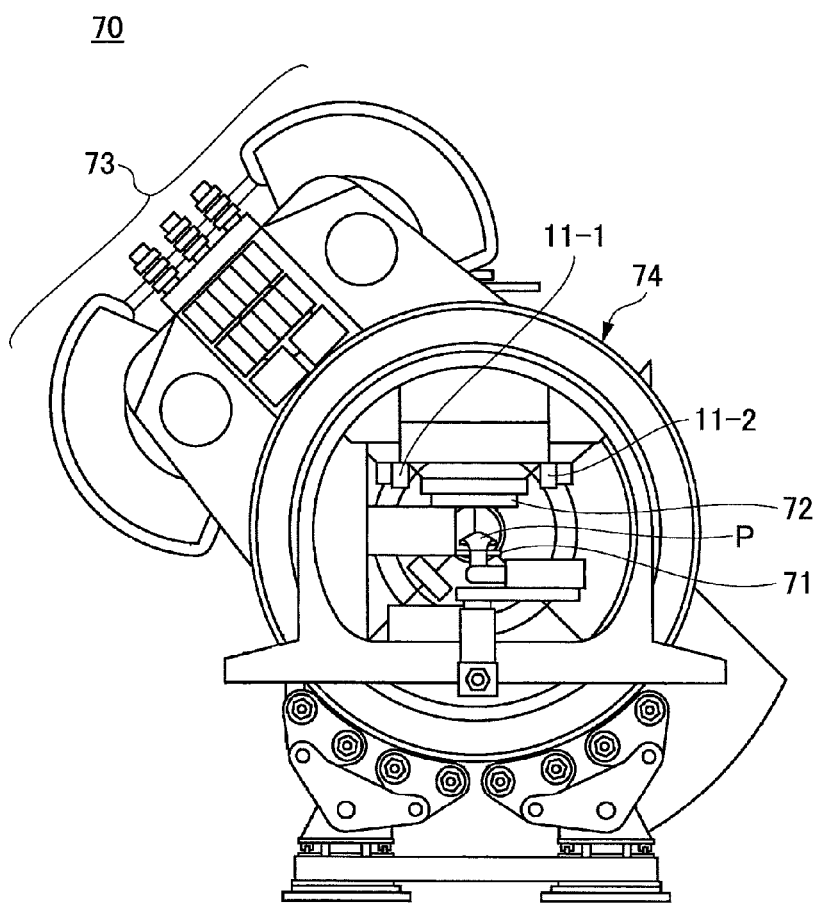
FIG. 9 is a drawing illustrating an example of a charged particle radiation therapy apparatus including a nuclear medicine diagnosis apparatus.
Figure 10:
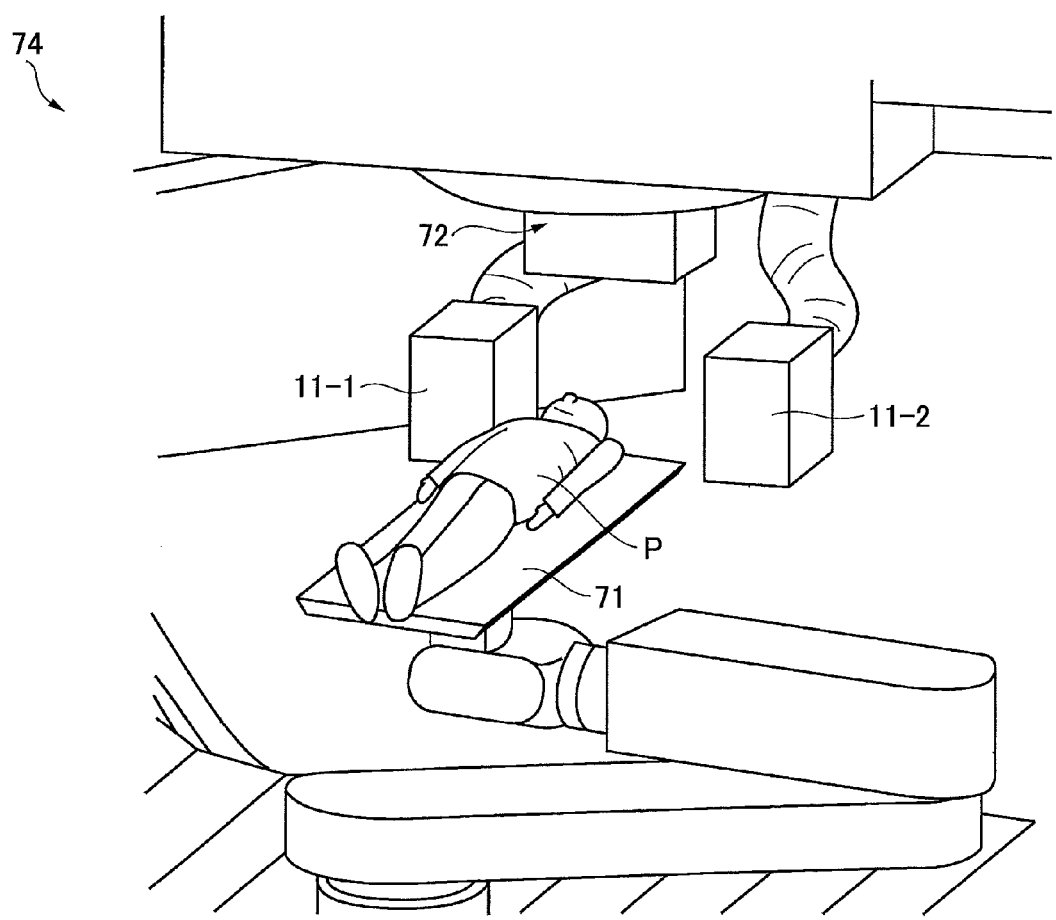
FIG. 10 is another drawing illustrating an example of a charged particle radiation therapy apparatus including a nuclear medicine diagnosis apparatus.

FIGS. 9 and 10 are drawings illustrating an exemplary charged particle radiation therapy apparatus 70 including the nuclear medicine diagnosis apparatus 20. FIG. 9 is an elevation view of the charged particle radiation therapy apparatus 70, and FIG. 10 is a perspective view of the charged particle radiation therapy apparatus 70. Below, components of the charged particle radiation therapy apparatus 70 that are related to the radiation detectors 11-1 and 11-2 of the nuclear medicine diagnosis apparatus 20 are described, and descriptions of other components are omitted.

As illustrated by FIGS. 9 and 10, the charged particle radiation therapy apparatus 70 may include an accelerator (not shown) that accelerates charged particles to emit a charged particle beam, an irradiation nozzle 72 that irradiates a patient P on a bed 71 with the charged particle beam emitted by the accelerator, a beam transport line 73 that transports the charged particle beam from the accelerator to the irradiation nozzle 72, and a rotating gantry 74 that can rotate the irradiation nozzle 72 in a predetermined direction at a predetermined speed. The charged particle radiation therapy apparatus 70 can irradiate the patient P with the charged particle beam from a desired direction by rotating the rotating gantry 74.

The charged particle radiation therapy apparatus 70 also includes the radiation detectors (gamma ray detectors) 11-1 and 11-2 of the nuclear medicine diagnosis apparatus 20 of the present embodiment. When not detecting gamma rays, the radiation detectors 11-1 and 11-2 are retracted to the sides of the irradiation nozzle 72. When detecting gamma rays, the radiation detectors 11-1 and 11-2 are moved to the sides of the patient P as illustrated in FIG. 10.

Here, because the charged particle radiation therapy apparatus 70 includes the irradiation nozzle 72, it is difficult to arrange multiple radiation detectors to completely (360 degrees) surround the patient P. For this reason, a pair of radiation detectors 11-1 and 11-2 is provided in the charged particle radiation therapy apparatus 70 so as not to interfere with the radiation nozzle 72.

Although the number of gamma rays detectable with the pair of radiation detectors 11-1 and 11-2 may be less than the number of gamma rays detectable with radiation detectors arranged in a circle around the patient P, it is still possible to obtain an image at high sensitivity and high resolution by using the nuclear medicine diagnosis apparatus 20 and the image processing method of the present embodiment.

As described above, the present embodiment makes it possible to improve the sensitivity of detectors and thereby makes it possible to obtain a high-resolution image. More specifically, the present embodiment makes it possible to improve the sensitivity of even a semiconductor detector without increasing the volume of a semiconductor crystal such as CdTe by using signals that are not detected at the same time by a pair of detectors and are ignored as noise in the related-art technologies. In other words, the present embodiment makes it possible to improve the sensitivity of a semiconductor detector to a level that is equal to or greater than that of a scintillation detector. Further, the sensitivity of a scintillation detector can also be improved using the image processing method of the present embodiment.

The present invention is not limited to the specifically disclosed embodiments, and variations and modifications may be made without departing from the scope of the present invention. Also, the configurations and methods described above may be combined in any appropriate manner.

An aspect of this disclosure provides an image processing method, a nuclear medicine diagnosis apparatus, and a storage medium including a program that make it possible to obtain an image at high sensitivity and high resolution.

The above described embodiments and their combinations may also be applied to a method, an apparatus, a system, a computer program, a storage medium, and a data structure.

What is claimed is:

1. A method performed by a nuclear medicine diagnosis apparatus, the method comprising:
   reconstructing a first image from first measurement data obtained by detecting a pair of radioactive rays emitted from a measurement target;
   reconstructing a second image from second measurement data obtained by detecting a single radioactive ray emitted from the measurement target; and
   generating a final image based on the first image and the second image, wherein the final image is generated by adding the first image and a correction image that is generated by multiplying the first image and the second image in units of pixels.

2. The method as claimed in claim 1, wherein the second measurement data is obtained by detecting multiple photons resulting from the single radioactive ray according to Compton scattering.

3. A nuclear medicine diagnosis apparatus, comprising:

a first image reconstruction unit that reconstructs a first image from first measurement data obtained by detecting a pair of radioactive rays emitted from a measurement target;

a second image reconstruction unit that reconstructs a second image from second measurement data obtained by detecting a single radioactive ray emitted from the measurement target; and a final image generating unit that generates a final image based on the first image and the second image, wherein the final image generating unit generates the final image by adding the first image and a correction image that is generated by multiplying the first image and the second image in units of pixels.

4. The nuclear medicine diagnosis apparatus as claimed in claim 3, wherein the second image reconstruction unit reconstructs the second image from the second measurement data that is obtained by detecting multiple photons resulting from the single radioactive ray according to Compton scattering.

5. A non-transitory computer-readable storage medium storing a program for causing a computer to perform a method, the method comprising:

reconstructing a first image from first measurement data obtained by detecting a pair of radioactive rays emitted from a measurement target;

reconstructing a second image from second measurement data obtained by detecting a single radioactive ray emitted from the measurement target; and generating a final image based on the first image and the second image, wherein the final image is generated by adding the first image and a correction image that is generated by multiplying the first image and the second image in units of pixels.

6. The storage medium as claimed in claim 5, wherein the second measurement data is obtained by detecting multiple photons resulting from the single radioactive ray according to Compton scattering.

* * * * *